Sept. 3, 1963                H. W. HOUCK ETAL                    3,102,980
              MULTISTAGE FREQUENCY MEASUREMENT SYSTEM UTILIZING
                     PREDETERMINED FREQUENCY SLIP FACTORS
Filed March 18, 1960                                        3 Sheets-Sheet 1

INVENTORS
HARRY W. HOUCK
NORMAN W. GAW, JR.
By John J. Logan
ATTORNEY

United States Patent Office 3,102,980
Patented Sept. 3, 1963

3,102,980
MULTISTAGE FREQUENCY MEASUREMENT SYSTEM UTILIZING PREDETERMINED FREQUENCY SLIP FACTORS
Harry W. Houck, Wallpack, and Norman W. Gaw, Jr., Kinnelon, N.J., assignors to McGraw-Edison Company, Elgin, Ill., a corporation of Delaware
Filed Mar. 18, 1960, Ser. No. 15,956
11 Claims. (Cl. 324—79)

This invention relates to the field of frequency measurement and more particularly it relates to the measurement of unknown frequency covering a wide frequency spectrum.

A principal object of the invention is to provide a frequency meter which is capable of identifying or measuring frequencies in a high frequency spectrum, especially high frequency radio signals, and which does not require a special signal generator having a variable frequency oscillator.

Another object is to provide a frequency meter which enables the frequency from an unknown source to be expeditiously and directly indicated without the use of a signal generator of the variable frequency oscillator kind.

Another object is to provide a frequence meter which enables the frequency of an unknown source to be directly indicated from the meter itself without requiring resort to normal calibration charts or tables.

Another object is to provide a frequency meter which comprises, as part of the meter, a single master oscollator as a reference and which supplies subdivided frequency references for a succession of specially controllable frequency subtractive heterodyne stages. Each stage is controlled by a harmonic selector and an associated resonant tunable circuit. The harmonic selector and resonant circuit are provided with correlated numerical indicator dials whereby the setting of the harmonic selector can be directly visually indicated by the setting of the tuned circuit dial so as to automatically produce the proper slip frequency factor whereby the difference frequency of each heterodyne stage is limited to a practical range for feeding the resonant circuit of the next succeeding heterodyne stage.

A feature of the invention relates to a novel frequency metering system of the kind having a source of successive frequency subtractive heterodyne stages and employing a single fixed frequency master oscillator for one stage and a series of subharmonics one for each of the remaining heterodyne stages. Each stage is provided with a tunable resonant circuit for selecting from the input frequencies thereto a restricted band of frequencies correlated with that particular stage and bearing a definite relation to corresponding significant numerical digits of the digital value of the frequency to be measured.

The tunable resonant circuit for each stage has a visual indicator which directly indicates the resonant setting of that stage to display a digit representing the significant digit of the unknown frequency being operated upon at that particular stage. The displayed digit is then used as a comparison digit for setting the selector element of the associated harmonic selector. However, when the said two digits agree, the harmonic selector selects a harmonic having a predetermined slip frequency factor. Thus, the setting of the tuned resonant circuit at each given stage directly and visually indicates to the operator the appropriate setting to be made for the associated harmonic selector of that stage in such a way that the heterodyne frequency to be applied to the resonant circuit of the next succeeding stage is limited to the practical tuning range of the said resonant circuit of the next stage.

Another feature relates to a frequency meter having a series of frequency subtractive stages whereby an unknown frequency can be subjected to successive decremental frequency selections, each stage corresponding to a significant digit in the digital value of the unknown frequency. The first or input stage of the meter is excited by the unknown input frequency and is selected by a corresponding tuned resonant circuit for that stage so as to produce for heterodyning a "signal frequency" which is nearest to the frequency of the highest significant digit of the digital value of the unknown frequency, which digit is directly and visually indicated on a calibrated scale for the tuned circuit. The local oscillation for mixing with the said tuned input signal frequency is derived from a selectable harmonic of a master oscillator of fixed frequency, the selection of the harmonic being indicated by a selector index which is the same as the digital indication for the associated tuned circuit but which produces a predetermined slip frequency factor in the selected harmonic. The difference frequency between the selected harmonic and the output of the tuned resonant circuit of the input stage is thereby limited to a restricted range and feeds the tunable resonant circuit of a next succeeding stage which is also provided with a harmonic selector, the calibration of which, with respect to the calibration of the tuning of the resonant circuit of the said succeeding stage, automatically produces the same predetermined slip frequency factor in the said succeeding stage.

A further feature relates to a novel direct reading frequency meter wherein an unknown signal input frequency, for example a multi-megacycle signal, is identified to the closest megacycle significant digit by a tunable resonant circuit and peak meter combination. The appropriate harmonic from a fixed frequency master oscillator is selected by a calibrated dial whose setting is visually correlated with the setting of the tuned circuit so as to select an appropriate harmonic of a predetermined fixed frequency below the said selected closest megacycle in the said input signal so that there is produced a predetermined fixed slip frequency factor between the selected harmonic and the output of the resonant circuit. The said selected harmonic and resonant output signal are mixed to produce a difference frequency for application as the input signal frequency to a tunable resonant circuit of a next succeeding stage. The said next succeding stage is also provided with a calibrated harmonic selector and indicator scale for producing the same frequency slip factor between the selected harmonic and the output signal of the resonant circuit of the second stage. The meter may also include additional similar subsequent stages so that the actual digital value of the said unknown input frequency can be directly read from the settings of the scales associated with the respective tunable resonant circuits of the successive stages.

A further feature relates to a frequency meter employing a plurality of similar frequency subtractive heterodyne stages, each stage having a tunable resonant circuit for tuning the input thereof to a peak frequency which corresponds to the value of the corresponding significant digit of the digital value of the frequency to be measured. Each stage also has a source of local oscillations for mixing with the output of the associated resonant circuit of that stage, the said local oscillations being derived from a harmonic selector of a fixed master frequency. The indicator scale for harmonic selector and the indicator scale for the associated tuned circuit are so arranged that the tuning of the tuned circuit to the peak resonant condition automatically indicates the visual setting for the harmonic selector which is such as to produce a predetermined fixed slip frequency factor between the selected harmonic and the output of the resonant circuit in each stage.

A further feature relates to a frequency meter comprising a plurality of subtractive frequency stages for subjecting an unknown frequency input to respective decremental frequency subtractions. Each stage has a resonant tunable circuit with a frequency indicating dial covering the corresponding decremental range of the input signals applied to that stage, a peak indicator for each stage for indicating the resonant tuning thereof. Each stage also has a harmonic selector with an associated calibrated selector scale. The calibrations of the tuning scale of the harmonic selector are such that while they visually indicate a setting numerically similar to the setting of the associated resonant circuit, nevertheless there is a predetermined slip frequency factor of value "$n$" between the actual tuning of the tuned circuit and the selected harmonic. As a result, the difference frequency between the selected harmonic and the output of the tuned resonant circuit is confined to a band within the practical tuning limit of the resonant circuit of the next succeeding stage while at the same time protecting the succeeding stage from false indication by undesirable harmonics.

A still further feature relates to the novel organization, arrangement and relative location and interconnection of parts which cooperate to provide an improved, accurate and simplified direct reading frequency meter for determining the frequencies of unknown radio signals.

Other features and advantages not specifically enumerated will be apparent after a consideration of the following detailed descriptions, the attached drawings, and the appended claims.

Figure 1:
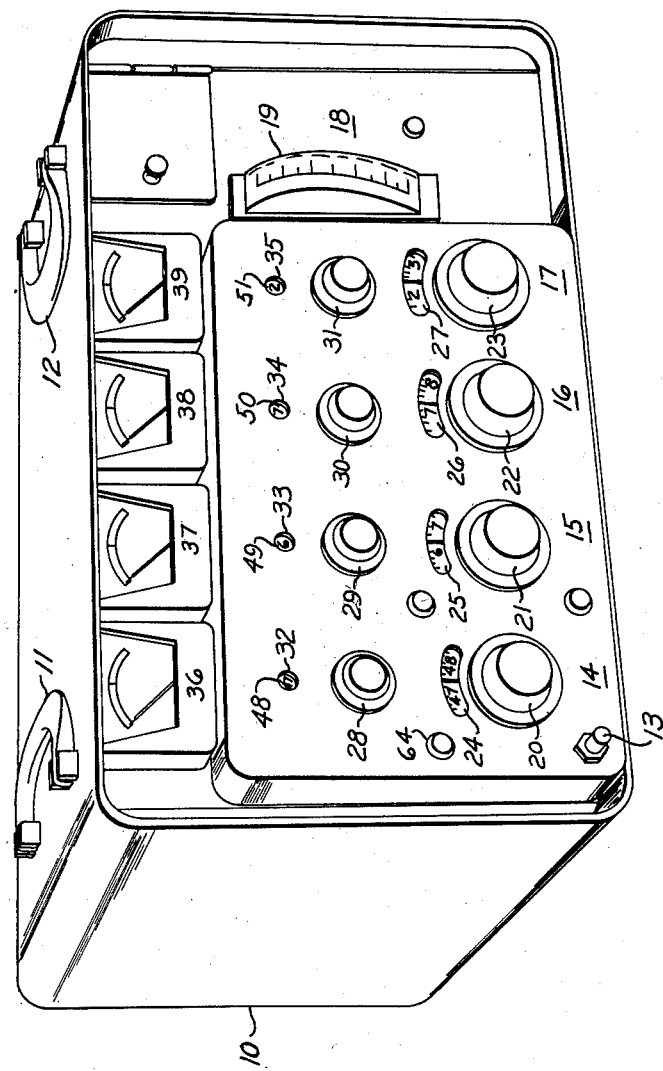
FIG. 1 is a perspective view of the instrument or meter embodying the invention.
Figure 2:
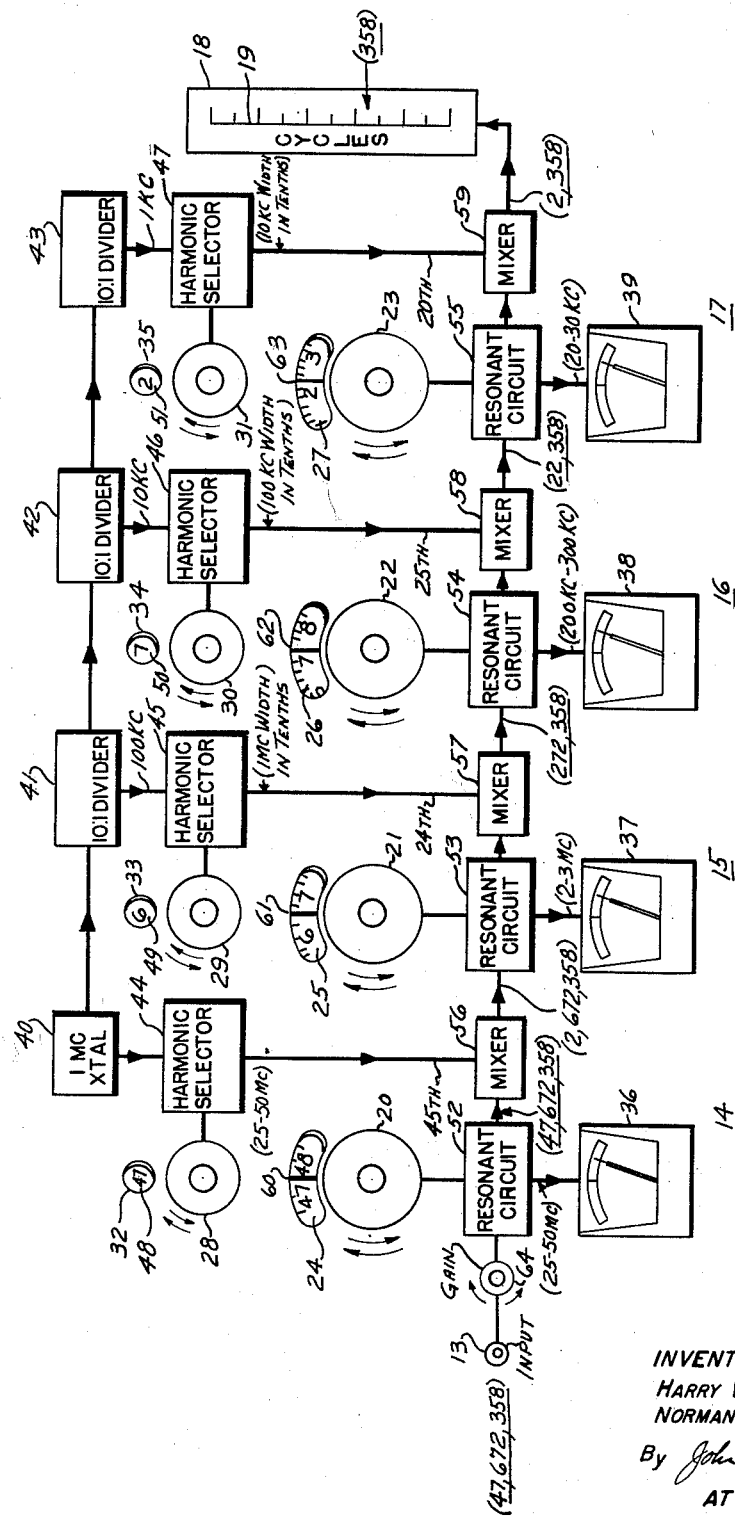
FIG. 2 is a schematic block diagram of the meter or frequency measuring system according to the invention.
Figure 3:
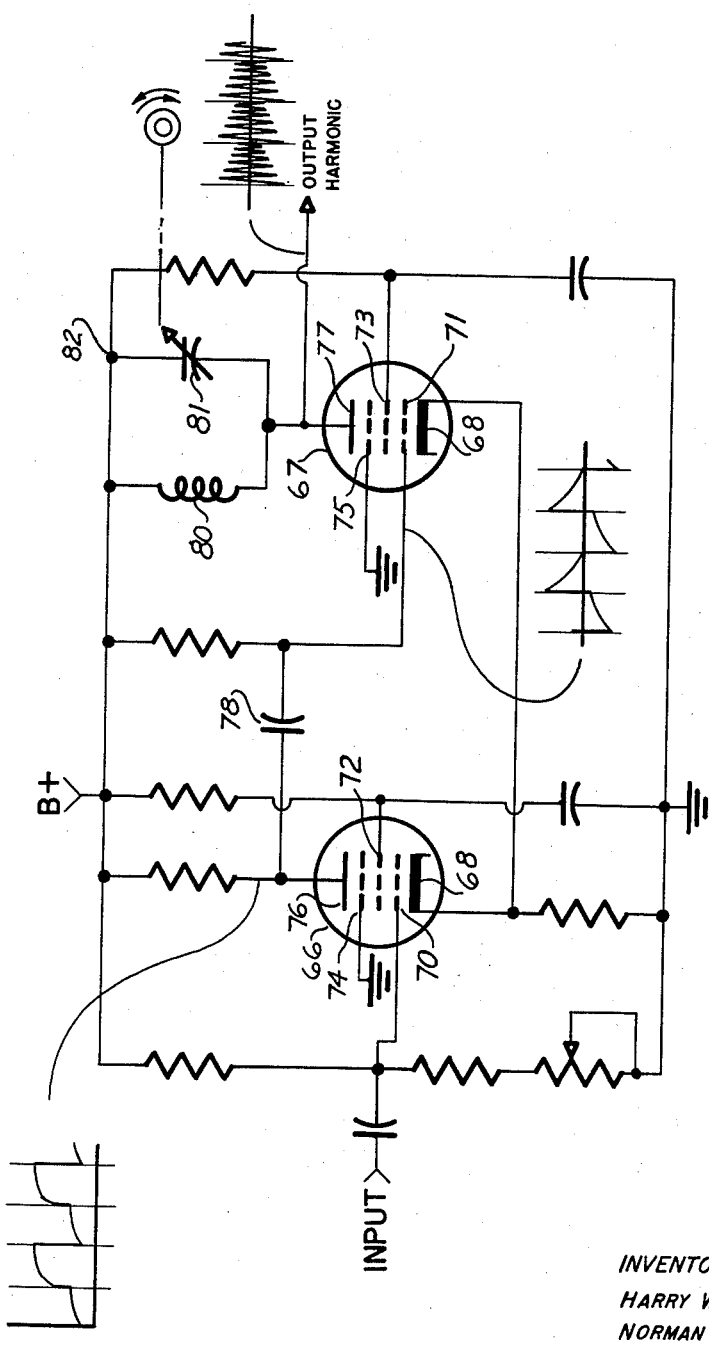
FIG. 3 is a schematic wiring diagram of a novel harmonic selector that is used in the meter of FIG. 1 and the system of FIG. 2.

Referring to FIG. 1, a description will now be given of the meter according to the invention. The meter comprises a suitable ventilated casing for the various electric circuit components and controls which are schematically shown in FIGS. 2 and 3. These components can be mounted on a suitable chassis for removal from the meter casing 10 and the casing is provided with any convenient carrying handles 11, 12. The front panel of the instrument carries an input jack 13 into which can be plugged a transmission line leading from the source of unknown frequency to be measured. The instrument may comprise four frequency subtractive stages 14–17 and a final cycle counting stage which is provided with a rotary drum dial 19 calibrated for example between 0 and 1000 cycles per second.

Each subtractive stage includes a resonant tuning circuit with a respective tuning dial 20–23 and a respective associated calibrated scale 24–27. Merely as an illustrative example, it will be assumed that the instrument is designed to determine or measure any frequency in the basic range 25 megacycles to 50 megacycles, in which case the associated scale 24 of the first stage will have numerical markings 25 to 50. The scale 25 for the second stage will have calibrated markings in a predetermined range correlated with the interstage slip frequency factor to be described hereinbelow. These markings will consist, for example, of the numerals 0 to 9 with any required intervening fine division markings. Likewise the scale 26 associated with the third stage will have numerical markings 0 to 9 with intervening fine markings, as will the scale 27 associated with the fourth stage 17. Forming part of each stage is a harmonic selector knob 28–31 and an associated calibrated scale which is visible through a respective one of small windows 32–35. The scale for window 32 carries successive markings, for example 25 to 50, while the scales visible through the windows 33–35 carry scale markings numbered 0 to 9 with intervening fine markings. Each of the knobs 28–31 controls the variable element of respective harmonic selector, the preferred form of which is illustrated in FIG. 3 of the drawing and will be described hereinbelow.

Also associated with each stage is a respective tuning indicator 36–39 to indicate when the associated tunable circuit controlled by the respective knobs 20–23 is tuned to resonance with the input signals thereto. These indicators preferably are in the form of peak indicator meters whose pointers indicate resonance condition of the associated circuits.

The panel carries at each of the windows 32–35 suitable decadic markings for example 1 mc., 100 kc., 10 kc., 1 kc., which represent the fixed frequency which is used as a reference frequency for each of the harmonic selectors in the respective stages. In accordance with one phase of the invention, the reference frequencies for the various harmonic selectors are produced by a 1 megacycle secondary standard such as a crystal oscillator which supplies the reference frequency for the first stage. This 1 megacycle frequency is then subdivided in respective frequency subdividers associated with each of the stages to produce the respective 100 kc., 10 kc., and 1 kc. reference frequencies for the harmonic selectors of those stages. Thus, by operating the knobs 28–31, the appropriate harmonic of the respective fixed frequency can be chosen for heterodyning with the signal at the output of the associated tuned resonant circuit in the respective one of the stages 14–17. In other words, the selected harmonic from the fixed reference frequency of any given stage can be considered as the local oscillator for the heterodyne operation of that stage, while the signal output of the associated tuned resonant circuit can be considered as the signal to be heterodyned. For example, the selected harmonic of the 1 megacycle frequency in the first stage is heterodyned with the output from the associated tuned circuit controlled by knob 20 to produce a difference frequency which difference frequency is fed as a "signal frequency" into the tuned resonant circuit for the next stage. In the said next stage the said input signal frequency is heterodyned with an appropriate selected harmonic determined by the setting of knob 29 of that stage. Similarly for the remaining two stages. The output of the final stage 17, being in the audio-frequency range of 0 to 1000 cycles, can be used to operate any well known form of cycle counter having the cycle indicator 19.

One of the features of the invention is that the meter can be used expeditiously and even by relatively inexperienced personnel to determine any unknown frequency. All that the operator has to do is tune any given stage, for example stage 14, to resonance with the input signal frequency and observe the number which appears on the scale 24. The corresponding knob 28 of the associated harmonic selector can then be turned until the same number appears through window 32. However, the harmonic selector is so arranged that while the same numbers thus appear, nevertheless the harmonic selector chooses a harmonic which is lower in frequency than that normally used to produce a zero beat in the heterodyning stage. This difference between the zero beat oscillator frequency, which is normally used in heterodyning systems, and the actual harmonic frequency which is selected according to the invention is referred to herein as the interstage slip frequency factor, the advantages of which will appear from the ensuing descriptions. Thus, for example, if the unknown frequency to be measured were a 47 megacycle frequency, scale 24 would indicate that fact by the appearance of the numeral 47 in the center of the associated viewing window. While, therefore, the knob 28 is according to the invention adjusted to display the same number 47 in the window 32, that setting of knob 28 would cause the 45th harmonic to be selected for the first heterodyning stage. Thus, there would be a slip frequency factor of 2 which in specific numerical figures would represent 2 megacycles. Similarly for the remaining stages. The difference frequency of 2 megacycles from the first stage would be fed to the tuned resonant circuit of the second stage, which resonance would be indicated on the scale 25 by the corresponding numeral, for example numeral 0. The knob 29 would then be adjusted until the numeral 0 appears in window 33. With that setting of knob 29, there would be selected the 18th harmonic of the 100 kilocycle reference frequency for that stage instead of the normal 20th harmonic. In other words, the interstage slip frequency factor would again be 2 as for the first stage.

Thus, the signal input to the tunable resonant circuit of stage 16 would be the difference frequency of 200 kilocycles from the preceding stage. The stage 16 would then be tuned by the knob 16 to display the corresponding numerical digit, for example 0, on the scale 26. The knob 30 would then be turned to display the same numeral 0 in window 34. However, instead of the knob 30 selecting the 20th harmonic of the 10 kilocycle signal, the 18th harmonic is selected so as to produce at the output of the 3rd stage a difference frequency of 20,000 cycles. Similarly for the fourth stage. The knob 31, instead of selecting the 20th harmonic from the associated 1 kilocycle reference, selects the 18th harmonic to produce at the output of the fourth stage a difference frequency of 2000 cycles. In other words, the slip frequency factor of all the stages is 2, but the actual numerical value of the respective frequencies is in accordance with the particular stage under consideration. For example, the actual slip frequency between the first and second stages is 2 megacycles. The actual slip frequency between the second and third stages is 200,000 cycles. The actual slip frequency difference between the third and fourth stages is 20,000 cycles.

In addition to simplifying the operation of the meter, the above noted slip frequency factor has a number of advantages which are of fundamental importance in achieving the accuracy and reliability of the meter. One of these advantages is that the resonant tuned circuit can be designed to cover a practical tuning range. For example, the second tuning range need only cover from 2 to 3 megacycles. The third stage need only cover the range from 200 kilocycles to 300 kilocycles, and the fourth stage need only cover the range from 20 kilocycles to 30 kilocycles. It is possible, therefore, to design these resonant tuning circuits with high Q. Furthermore, the problem of interfering harmonics between the various stages is substantially eliminated. Furthermore, by direct visual observation of the numbers appearing in the windows associated with scales 24–27 and the indicator 18 it is possible to read directly the exact numerical value of the unknown frequency applied to the input jack 13 and without reference to any separate calibration charts.

A more detailed description will now be given of the meter system by referring to FIG. 2. All the elements shown in the remaining blocks of FIG. 2 can be of any well known construction and circuit configuration, but preferably the harmonic selectors are of a novel kind (FIG. 3). It should be observed that the several corresponding elements shown in FIGS. 1 and 2, with the exception of the location of the indicating meters, are arranged in the same general spatial array and bear the corresponding designation numerals.

Common to all the stages 14–17 is a master oscillator 40, which may be a 1 megacycle crystal oscillator of any well known kind, which acts as a secondary frequency standard which can be checked from time to time against a primary standard such for example as with the frequency signals transmitted by the Bureau of Standards Radio Station WWV. Preferably the crystal oscillator 40 is oven-temperature-controlled and is stable enough to hold its calibration over extended periods of time. The frequency from crystal oscillator 40 is subdivided through a series of decadic frequency dividers. Thus, the divider 41 produces a reference frequency of 100 kilocycles; divider 42 a reference frequency of 10 kilocycles; and divider 43 a reference frequency of 1 kilocycle. Each reference frequency feeds a respective adjustable harmonic selector of the associated stage. Thus, the oscillator 40 feeds the harmonic selector 44 of stage 14; divider 41 feeds the adjustable harmonic selector 45 of stage 15; divider 42 feeds the adjustable harmonic selector 46 of stage 16; and divider 43 feeds the adjustable harmonic selector 47 of stage 17. These harmonic selectors, especially for the first or 1 megacycle stage, are preferably, although not necessarily, of the kind disclosed in FIG. 3 of the drawing which will be described in detail hereinbelow.

The proper harmonic to be selected from any harmonic selector is visually indicated by one of the numbers 0 to 9 appearing through the associated window 32–35. Since the first stage covers the entire assumed range of 25 to 50 megacycles, the scale 48 carries numbers 25–48. However, the remaining scales or dials 49–51 carry the numbers 0–9. Likewise the scale 24 for the resonant circuit of the first stage carries the numerals 25–50; while scales 25–27 merely carry the numbers 0–9. Each of the windows for the scales 24–27 has a central fixed reference marking line 60–63. The knobs 20–23 with their respective scales 24–27 are connected to the tuning element or elements of the respectively tunable resonant circuits 52–55. Each of these circuits can be of any well known design preferably having a high Q so that they can be sharply tuned to any frequencies in the tuning range of the circuit. Each tunable resonant circuit has associated therewith the respective resonance indicating meter 36–39 to indicate when the associated tuned circuit is at resonance with the input frequencies thereto. For convenience of description, the frequency applied to the input of each resonant circuit will be referred to herein as a "signal frequency" for application to the associated mixer-amplifier 56–59; while the input to each mixer derived from the associated harmonic selector will be referred to as the local oscillation frequency, so as to conform with standard terminology as used in heterodyne systems.

The setting of each of the scales 24–27 as determined by the tuning of the associated resonant circuit indicates visually the respective frequency in the successive decremental frequency stages. For example, let it be assumed that the unknown frequency applied to input jack 13 is 47,672,358 cycles per second. The knob 20 is turned until the meter 36 by its peak reading indicates that the circuit 52 is in resonance between 47 and 48, which two numerals appear on the scale 24 on either side of the fixed reference mark 60. In order to correlate the various meters, a suitable gain control or attenuator 64 may be adjusted so that the indicating needle of the indicator 36, when the circuit is tuned to resonance, does not go off scale. When so tuned to resonance, the knob 28 is then adjusted until the numeral 47 appears in window 32. When the number 47 appears before the window 32, the proper harmonic is selected by the harmonic selector 44 to produce the requisite interstage slip frequency factor "$n$" above mentioned. In other words, even though the scale 48 indicates the numeral 47, actually the knob 28, when at that particular position, selects the 45th harmonic of the 1 megacycle frequency from oscillator 40. Thus the scale 24 indicates the first two significant digits "47" of the unknown frequency and since the interstage slip frequency factor is presumed to be "2," the output of the selector 44 is a 45 megacycle frequency. This local oscillator frequency is fed to the associated mixer 56, together with the tuned input signal from the circuit 52. Thus, there appears at the output of the mixer 56 a frequency of 2,672,358 cycles. It will be understood, of course, that the mixer 56 may be of the broad band type.

Thereupon the knob 21 is adjusted to tune the circuit 53 to the signal from mixer 56 which resonant tuning condition is indicated by the associated meter 37. Since the first two significant digits of the difference frequency from mixer 56 are "26," when the circuit 53 is in resonance, the marker line 61 is located between numerals 6 and 7 on scale 25. The knob 29 is then turned to expose through the window 33 the digit 6. In that setting of knob 29, the harmonic selector 45 selects the 24th harmonic of the 100 kilocycle signal from divider 41, thus producing at the output of mixer 57 a difference frequency of 272,358 cycles.

This latter difference signal is then applied to the input of the next resonant circuit 54 which is tuned by knob 22 and meter 38 to resonance therewith, in which condition the marker line 62 is located between the numerals 7 and 8 of scale 26. Thereupon the knob 30 is turned until the numeral 7 appears in window 34, which causes the associated harmonic selector 46 to select the 25th harmonic of the 10 kilocycle frequency from divider 42. This produces at the output of mixer 38 a difference frequency of 22,358 cycles. This latter difference frequency is then applied to the input of resonant circuit 55, which is tuned to resonance by the knob 23 and the meter 39, causing the fixed marker line 63 to be located between the numbers 2 and 3 on scale 27. Thereupon the knob 31 is turned until the numeral 2 appears in window 35, which causes the harmonic selector 47 to select the 20th harmonic of the 1 kilocycle frequency from divider 43. Thus, there appears at the output of mixer 59 a difference audio-frequency of 2,358 cycles.

This audio-frequency can then be applied to any well known cycle counter 18 which causes the scale 19 to move to bring the 358 cycle marking in line with the pointer 65. The movable scale of the counter 18 can be biased so that it does not register beyond the 0 marking until 2000 cycles have been counted, thus causing 2,358 signal to be indicated as a 358 cycle signal. It will be understood, of course, that any other well known form of cycle counter can be employed.

Having set the various knobs as above described, the operator is enabled to read off directly from the scales 48 to 51 and the counter 18 the exact numerical value of the unknown frequency. As a double check the operator can also directly read off the frequency appropriately from the scales 24–27. Thus, by reading the first scale 24 the operator knows that the frequency is between 47 and 48 megacycles and that by reading scale 25 he sees that the next significant figures is 6; by reading scale 26 he sees that the next significant figure is 27; by reading scale 27 he sees that the next significant figure is 2; and the final digits are read directly off the counter 18. Of course, the easier way to read out the frequency is from the scales 48–51.

While in the foregoing there has been described a system wherein the interstage slip frequency factor "n" is equal to 2, it will be understood that the harmonic selection may be controlled by the respective knobs in the various stages so that when the same numeral appears through the viewing windows on the corresponding tuned circuit and associated harmonic selector, the slip frequency may be 3 or more. In that event, of course, the associated resonant circuits will be designed to accommodate the corresponding difference frequency. For example, if the system is designed for an interstage slip frequency factor "n" equal to 3, then the successive selectors 44, 45, 46 and 47 will select the following respective harmonics: 44th, 23rd, 24th and 19th. In that case the tuned circuits 52, 53, 54, 55 will respectively cover the tuning range 3 megacycles to 4 megacycles; 300 kilocycles to 400 kilocycles; 30 kilocycles to 40 kilocycles.

Furthermore, the invention is not limited to a system wherein a uniform slip frequency factor is used between all the stages. For example, the first stage may cause the harmonic selector 44 to select a harmonic producing a slip frequency factor of 2; the harmonic selector 45 of the next stage may be set to produce a slip frequency factor of 3; it being understood, of course, that the respective resonant circuits will cover a corresponding tuning range.

Summarizing the above, the system can produce a percentage of accuracy in frequency indication which is equal to that of the reference crystal oscillator 40. It was found that the maximum error was equivalent to $0.000001 f$ plus or minus 20 cycles per second where $f$ is the measured frequency in cycles per second. Furthermore, the system is unique in that it avoids the drawbacks of previous systems which have usually involved precise calibration of oscillators or tank circuits. The meter, according to the invention, does not depend on precise calibration for its accuracy. By grouping relatively standard components of stable but not necessarily precise circuitry, it is possible to measure frequency to an accuracy previously impossible in comparable instruments. The system has the additional following advantages:

(1) By working with higher order harmonics, harmonic amplitudes are more nearly constant.

(2) By raising the frequency in each stage, a 3:2 frequency or 9:4 tuning capacitance range may be used in both the harmonic selectors and the tunable resonant circuits.

(3) The heterodyne frequency is far removed from either of the mixed frequencies, thus simplifying mixer design.

While certain specific frequency values have been mentioned hereinabove, it will be understood that they are given merely by way of example. Thus, while the meter has been described as covering an input range of 25 to 50 megacycles, it is quite clear that the meter could cover a wider range by the addition of an appropriate stage or stages ahead of the first stage 14. While the harmonic selectors 44, 45, 46 and 47 may be of any well known type, we have found that the best results were obtained employing a novel harmonic selector such as shown in FIG. 3 of the drawing for stage 14. As above described, the selector 45 of FIG. 2 is capable of covering a band of frequencies of 1 megacycle width with the band divided into tenths of a megacycle. Thus, in the particular example given above with a slip frequency factor of 2, the selector 45 is capable of selecting any of the harmonics from 1.8 megacycles to 2.8 megacycles. Likewise the harmonic selector 46 is capable of producing harmonics having a band of 100 kilocycles width with the band divided into ten divisions of 10 kilocycles each. Likewise the selector 47 covers a band of 10 kilocycles width with the band divided into subdivisions of 1 kilocycle. We have found that by using an arrangement such as shown in FIG. 3, it is possible to select any of the desired harmonics with precision and ease. The harmonic selector of FIG. 3 comprises a pair of grid-controlled tubes 66, 67. Merely for illustrative purposes, these tubes are shown as pentodes having the usual electron emitting cathodes 68, 69, respective control grids 70, 71, respective shield grids 72, 73, respective suppressor grids 74, 75 and respective plates or anodes 76, 77. The plate 76 is coupled through condenser 78 to the control grid 71. Thus, the variations of potential at plate 76 vary the plate current of tube 67. The tubes thus form a cathode-coupled multivibrator. The inductance 80 may be of the movable core type so as to enable continuous variation of inductance to be effected. The inductance 80 is connected in parallel with variable condenser 81, both of which may be separately tunable or they may be ganged together for unitary tuning so as to select the desired harmonic from the system. In the well known manner the fundamental frequency of the multivibrator is determined by the constants of the various resistors and capacitors connected to the grid 70 and the grid 71 and the multivibrator are synchronized with the input signal derived for example from the 1 megacycle oscillator 40 or by the dividers 41-43 as the case may be. We have found that by adjusting the elements 80 or 81, which constitute a tunable resonator, it is possible to cause the system to generate not only the fundamental frequency but any desired harmonic of that fundamental frequency, particularly the higher order of harmonics. It will be observed, of course, that the cathode 68 and 69 of both tubes are returned to common ground through a common load resistor in the manner well known in multivibrator circuits.

Various changes and modifications may be made in the disclosed embodiment without departing from the spirit and scope of the invention.

What is claimed is:

1. The frequency measuring system, comprising a plurality of decremental frequency subtractive stages each stage including a source of fixed reference frequency, a harmonic selector for each stage to select a particular harmonic of the fixed frequency for that stage which harmonic can be any one of ten harmonics of the fixed reference frequency for that stage, a tunable resonant circuit for each stage, means to apply an unknown frequency to the input of the tuned resonant circuit of the first stage, means to tune said resonant circuit to said unknown frequency and to produce a resonance indication, means to adjust said harmonic selector to select the particular one of said ten harmonics having a predetermined frequency slip factor of not less than two with respect to the tuned frequency output of said resonant circuit, mixer means for mixing said selected harmonic with said tuned output, means to apply the difference frequency between said selected harmonic and the tuned output of the resonant circuit of the first stage to the input of the tunable resonant circuit of the next stage, and means to adjust the harmonic selector of said next stage to select the particular one of the ten harmonics thereof having a predetermined frequency slip factor of not less than two with respect to the frequency of the tuned resonant circuit of said next stage whereby frequency inversion between successive stages is avoided.

2. A frequency measuring system according to claim 1 in which the tuning means for said resonant circuits of the first and second stages have respective calibrated dials which when set to resonance produce a direct numerical reading of the corresponding significant digit of said unknown frequency.

3. A frequency measuring system, comprising a plurality of decremental frequency subtractive stages, each stage including a source of fixed reference frequency, a harmonic selector for each stage to select a particular harmonic of the fixed reference frequency for that stage which harmonic can be any one of ten harmonics of said fixed frequency, a tunable resonant circuit for each stage, means to apply an unknown frequency to be measured to the input of the tunable circuit of the first stage, means to tune said resonant circuit to said unknown frequency and to produce a resonance indication, means to indicate when said circuit is at resonance with said unknown frequency, means to adjust said harmonic selector to select the particular one of said ten harmonics having a predetermined frequency slip factor of not less than two with respect to the tuned output frequency of said tunable circuit of the first stage, a numerically marked scale movable with the tuning element of said tuning means, another scale movable with the adjusting means of said harmonic selector and having the same numerical markings as the first mentioned scale, said adjusting means arranged when the scale of the associated harmonic selector displays the same numerical marking as said scale of said tunable circuit to cause said selector to select said harmonic which bears a predetermined slip frequency with respect to the frequency of the output of said tuned circuit, whereby the identifying significant digit of the unknown frequency at each stage is directly and visually indicated without frequency inversion between stages.

4. A frequency measuring system according to claim 3 in which the said selected harmonic and the tuned frequency of said resonant circuit for the first stage are mixed to produce a difference frequency, means to apply the last mentioned difference frequency to the input of the tunable resonant circuit of the next stage, means to tune the resonant circuit of said next stage to resonance with said last mentioned difference frequency, means to adjust the harmonic selector of said next stage to select a harmonic of the fixed reference frequency of said next stage which harmonic is at a predetermined frequency difference with the tuned output frequency of the resonant circuit of said next stage.

5. A frequency measuring system according to claim 4 in which the said harmonic selector for the said next stage produces said selected harmonic only when the indicating scale for the tunable resonant circuit and the harmonic selector of the associated stage display the same calibration number.

6. A direct reading frequency measuring system for identifying an unknown frequency, including at least two decremental frequency subtractive stages, each stage having a tuning dial with numerical markings to provide respective direct readings to corresponding successive significant digits of the unknown frequency number, each stage having a tunable resonant circuit for tuning by its dial to the frequency of a signal input thereto, each stage also having an adjustable harmonic selector for selecting the particular harmonic of ten harmonics of a fixed reference frequency for the stage and having a predetermined frequency slip factor of not less than two with respect to the frequency of the tuned output of the associated resonant circuit of that stage, a numerically calibrated scale for the resonant circuit of each stage, a numerically calibrated scale for the harmonic selector of each stage, means to set the scale of the harmonic selector of each stage until it displays an identification number the same as that displayed by the scale of the tuning element of the associated stage when tuned to resonance, whereby the said significant digits can be directly read from the respective scales and without frequency inversion between stages.

7. A direct reading frequency meter, comprising a plurality of decremental frequency heterodyning stages one for each significant digital value of an unknown frequency, a fixed frequency master oscillator, means to supply each stage with a reference frequency derived from said master oscillator the said frequencies bearing a decadic relation, a harmonic selector for each stage and fed with a corresponding one of said reference frequencies, a numerically calibrated dial for each harmonic selector to select any one of ten harmonics therefrom, a tunable resonant circuit for each stage and each having a calibrated dial and tuning indicator for tuning to the frequency of the signals applied to the input thereof, a mixer for each stage for mixing the selected harmonic of that stage with the frequency from the tuned resonant circuit of that stage, and means to adjust the harmonic selector in accordance with the setting of the associated tuned circuit at resonance to select a harmonic which bears a predetermined slip frequency factor of not less than two with relation to the frequency of the tuned resonant circuit output for all corresponding decremental settings of the tuning means of the resonant circuit and of the adjusting means of the associated harmonic selector whereby frequency inversion between stages is avoided.

8. A direct reading frequency meter, comprising a plurality of decremental frequency heterodyning stages each stage including a source of fixed reference frequency, a single frequency stabilized master oscillator for supplying said reference frequencies, a harmonic selector for each stage for selecting a particular harmonic of ten harmonics of the fixed reference frequency supplied to that stage, a tunable resonant circuit for that stage, means to apply an unknown frequency as a signal frequency to one stage, means to tune said one stage to resonance with the unknown frequency, a resonance indicator for each stage, means to mix the selected harmonic of said one stage with the tuned frequency output from the associated resonant circuit of said one stage to produce a heterodyne difference frequency to serve as the signal input for a next stage, said resonant circuit and said harmonic selector having respectively calibrated adjusting means which when set to correlated calibrated markings cause the harmonic selector to select a harmonic which has a predetermined slip frequency factor of not less than two with respect to said tuned circuit output frequency whereby frequency inversion between stages is avoided.

9. A direct reading frequency meter according to claim 8 in which the harmonic selector of each stage when adjusted to select a harmonic as indicated by the resonant tuning of the associated tunable circuit produces an interstage slip frequency factor which is substantially the same for all stages.

10. A direct reading frequency meter according to claim 8 in which the harmonic selector of each stage when adjusted to select a harmonic as indicated by the resonant tuning of the associated stage produces an interstage slip frequency factor which is different for certain stages.

11. A direct reading frequency meter, comprising a plurality of frequency subtractive heterodyne stages, each stage allotted to a corresponding significant digit of an unknown frequency to be measured and each stage including a tunable resonant circuit with an associated resonance indicator, a source of fixed reference frequency to provide reference frequencies for successive stages which are successively decadic submultiples of said fixed reference frequency, a harmonic selector in each stage to select any one of ten harmonics of the fixed reference frequency for the stage, a frequency mixer in each stage, means responsive to the tuning of any resonant circuit to resonance with an input signal to display a harmonic identification symbol, means to set the associated harmonic selector until it displays an identification symbol the same as said first mentioned symbol and thereby selects a high order harmonic of the associated reference frequency, means to apply the said high order harmonic and the output tuned frequency from the associated resonant circuit to the mixer of the corresponding stage to produce a difference signal having a slip frequency factor of not less than two and which is correlated with the tuning range of the resonant circuit of the next stage and without interstage frequency inversion.

References Cited in the file of this patent

UNITED STATES PATENTS

| 1,919,803 | Roetken | July 25, 1933 |
| 2,131,559 | Granger | Sept. 27, 1938 |
| 2,501,154 | Berman | Mar. 21, 1950 |
| 2,559,144 | Baracket | July 3, 1951 |
| 2,934,716 | Smith | Apr. 26, 1960 |
| 2,999,205 | Sichak et al. | Sept. 5, 1961 |

FOREIGN PATENTS

| 617,438 | Great Britain | Feb. 7, 1949 |

OTHER REFERENCES

Electronic Measurements, textbooks by Terman and Petit, McGraw-Hill Book Company, Inc., 1952, page 214.

Model FM-6 VHF Frequency Meter, publication of Gertsch Products Inc., 3211 S. La Cienega Blvd., Los Angeles 16, Calif., lithographed by Parker Enterprises Inc., July 1958; 5 pages.